May 8, 1962  G. BROUSSAUD ET AL  3,034,064
STORING DEVICE FOR ULTRA HIGH FREQUENCY PULSES
Filed March 31, 1959  2 Sheets-Sheet 1

3,034,064
STORING DEVICE FOR ULTRA HIGH FREQUENCY PULSES

Georges Broussaud and Victor Biggi, Paris, France, assignors to Compagnie Generale de Telegraphie Sans Fil, a corporation of France
Filed Mar. 31, 1959, Ser. No. 803,245
Claims priority, application France Apr. 9, 1958
5 Claims. (Cl. 328—121)

It may be desired under certain conditions to store, for limited time intervals $t$, signals whose duration is much shorter than $t$. This may be done for example for measuring the frequency of such signals.

Transmission lines may be used to this end. However, such lines have to be rather long and thus give rise to a substantial attenuation and, if bended, to troublesome reflexions. "Echo-boxes," or high-Q-factor cavity resonators of the wavemeter cavity type, may also be used. However, the selectivity of such resonators is very high and this sets substantial limitations in the use of such devices for the purpose mentioned.

It is accordingly an object of the invention to provide a storage device for short signals which has none of the above drawbacks.

A device according to the invention comprises a cavity resonator having dimensions which are very large compared to the wave length of said pulsed signals, said resonator having an input and an output; an amplifier tube having an input and an output; means for coupling said tube output to said resonator input; switching means for coupling said tube output to said resonator output; and means coupled to said tube output for controlling said switching means.

In a preferred embodiment of the invention, the resonator is coupled to an amplifier which is alternately fed from the resonator or from the source of the signals.

The invention will be best understood from the following description and appended drawings, in which.

Figure 1:
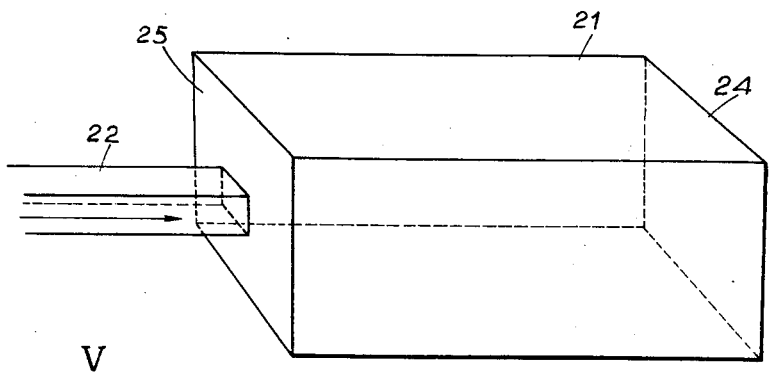
FIG. 1 illustrates, very diagrammatically, a storing circuit according to the invention.

Referring to FIG. 1, a rectangular cavity resonator 21 is coupled to a rectangular waveguide 22. The transversal dimensions of the latter are substantially smaller than those of the resonator, say about ten times smaller. A wave of frequency $f$ and wavelength $\lambda$ propagates in guide 22 in the direction of the arrow $\lambda$ being of the order of the dimensions of the guide. Let $s$ be the waveguide cross-section and $S$ that of the resonator.

The resonator being substantially matched to the guide, the wave enters the resonator without reflexion, propagates therein as a plane wave and is reflected completely on wall 24 of the cavity towards wall 25 thereof. Only a portion of the energy penetrates then into guide 22.

It will be now assumed that the wave propagating in the guide is pulse modulated, the duration of a pulse being $t$ and $W$ being the ultra high frequency energy contained in a pulse.

If $w_1$ is the energy returning to guide 22 when the wave has travelled once out and back in resonator 21, it may be considered to a first approximation that $w_1/W$ is equal to $s/S$, and accordingly, that $w_1 = Ws/S$. There remains thus in cavity 21 an amount of energy equal to $$W(1-s/S)$$

This energy travels once again out and back in cavity 21 and leaves this time in guide 22 an energy amount $w_2$, equal to $$W(1-s/S).\frac{s}{S}$$

the energy remaining in the cavity being equal to $W(1-s/S)^2$. After $n$ travels of the energy in the cavity, the latter retains an energy amount given by the relation:

$$W_n = W(1-s/S)^n$$

the energy amount in guide 22 being $$W_n = W(1-s/S)^n . s/S$$

Figure 2:
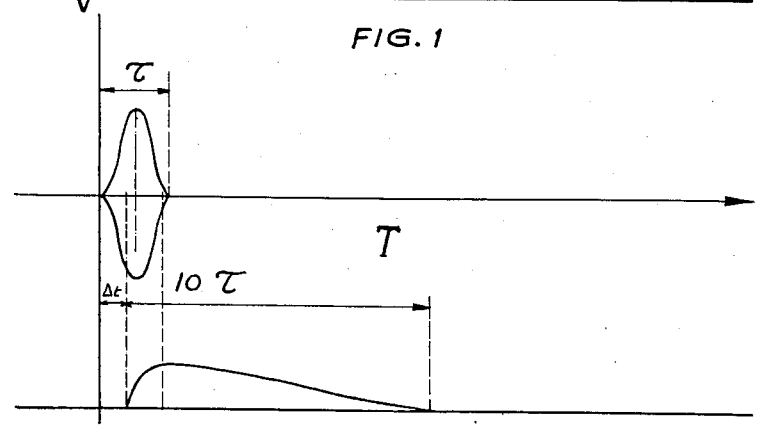
FIG. 2 shows curves which explain the operation of the device of FIG. 1.

Accordingly, the energy collected at the output of guide 22 has a wave form whose amplitude as a function of time is that shown in FIG. 2. This curve starts from zero, a time $\Delta t$ after the pulse is received, $\Delta t$ being the time necessary for the pulse to travel out and back in cavity 21. It reaches a maximum a time $\Delta t$ after the pulse has reached its peak and returns to zero after a time interval comprised, say, between $10\tau$ and $100\tau$, as experience shows.

Cavity 21 will thus keep the memory of the pulse during a period T which may be comprised between $10\tau$ and $100\tau$.

Experiments show that, $f$ being the carrier frequency of the wave energy propagating in guide 22, $\Delta f$ the passband of cavity 22 and V the volume thereof, the number of the resonance modes of this cavity is equal to $$N = \frac{8\pi}{\lambda^3} . V . \frac{\Delta f}{f} \qquad (1)$$

The dimensions of cavity 21 will be selected in accordance with Relation 1, so that number N covers the whole of the frequency spectrum of the received pulses.

Assuming, for example, that the pulse has a duration $\tau = 0.2$ microsecond, the carrier wavelength $\lambda$ being equal to 8 mm., the corresponding frequency band is:

$$\Delta f = \frac{1}{\tau} = \frac{10^6}{0.2} = 5 \text{ mc./s.}$$

Accordingly, $$\left|\frac{\Delta f}{f}\right| = \left|\frac{\Delta \lambda}{\lambda}\right| = 0.8 . \frac{5.10^6}{3.10^{10}} = \frac{4}{3} 10^{-4}$$

The smallest volume of cavity 21 corresponds to $N = 1$, which gives, $$V = \frac{\lambda^3}{8} . \frac{f}{\Delta f} = 150 \text{ cm.}^3$$

or a cube, the side of which is equal to 5.3 cm.

Figure 3:
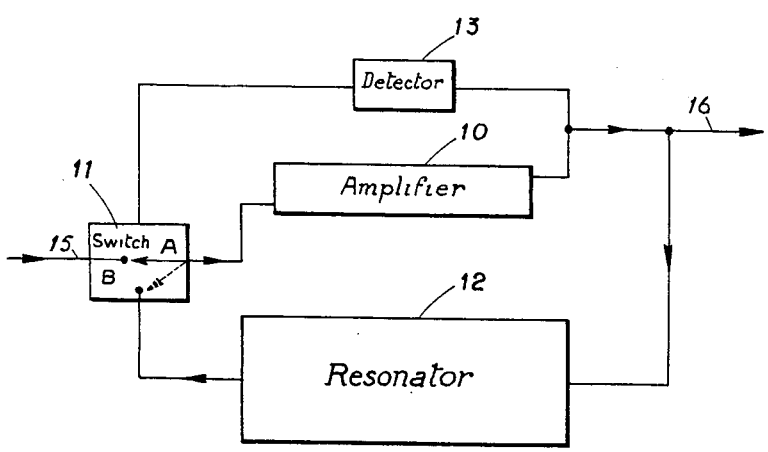
FIG. 3 illustrates another device according to the invention.

FIG. 3 illustrates, very diagrammatically, a device according to the invention.

It comprises a travelling wave tube 10, to the input of which ultra high frequency pulses may be applied through a switching device 11, for example of the ferrite type, having two possible positions A and B.

In position B, tube 10 is connected to the output of a cavity resonator 12, the input of which is connected to the output of tube 10, and in position A, i.e. in the rest position of switch 11, tube 10 is coupled to a pulse receiving system, such as, for example, an aerial 15. A video assembly 13, comprising a detector connected to the output of tube 10 and an amplifier, controls the operation of switch 11.

The operation of the system shown in FIG. 3 is as follows: when an ultra-high frequency pulse, having a duration of, say, 0.5 microsecond, is received, it is transmitted to tube 10. Upon amplification, the output energy of tube 10 divides between resonator 12, video system 13 and output 16.

Resonator 12 keeps the memory of the pulse for about 10 microseconds and video system 13 actuates switch 11 which then assumes position B. The switching lasts about 0.2 microsecond and during this time interval cavity 12 feeds energy of the input of the travelling wave tube 10 which then furnishes a new pulse of the same duration.

If the gain of tube 10 is of a sufficient value, one incoming pulse can initiate the re-emission of a plurality of pulses and applicants have found that, under the conditions stated, this gain should be of 20 dbs.

If only the resonance spectrum of the cavity is considered, only the volume of the cavity is to be taken into account. Should the level of the output signal also be taken in consideration, it may be noted that this level increases with the length of the cavity. For a given volume, a cavity having a substantial length should therefore be preferred.

Figure 4:
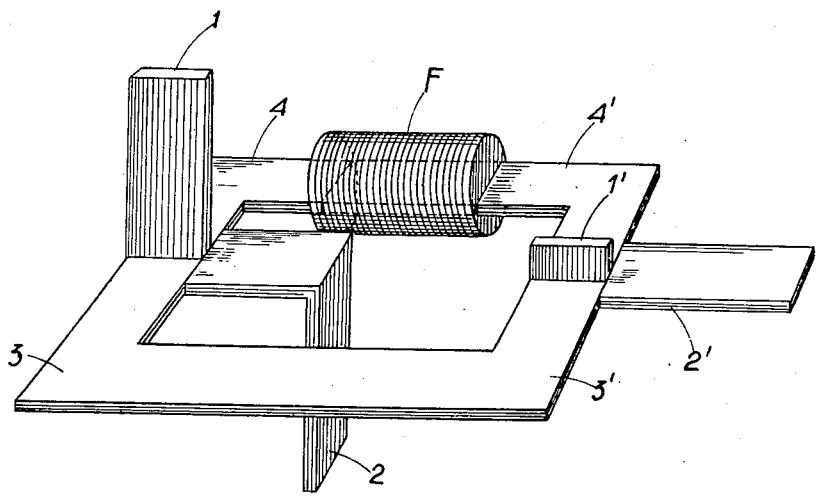
FIG. 4 is an embodiment of a detail of the equipment shown in FIG. 3.

FIG. 4 shows by way of example an embodiment of the switching device 11. It comprises essentially two magic T's. The signal is fed to arm 1 of one of the T's and resonator 12 is coupled to arm 2 thereof. Branches 3 and 4 are coupled respectively to branches 3' and 4' of the other magic T. A matched load is placed in branch 1' of this latter T and travelling wave tube 10 is coupled to its branch 2'. In branch 4—4' is located a ferrite and the branch is surrounded by a coil F, providing a magnetic field. This modifies, as is well known, the phase of the energy propagating in this branch. Coil F is controlled by video assembly 13.

The phase shift between arms 3—3' and 4—4' is made zero, when coil F is not in operation, and equal to $\pi$ when coil F is in operation. Under these conditions, all of the energy entering arm 1 is fed to the travelling wave tube 10, while energy propagating through branch 2, i.e. that derived from cavity 12, is absorbed by the load coupled to arm 1'.

When coil F is put in operation by device 13, the phase difference between arms 3—3' and 4—4' is made equal to $\pi$. The energy incoming from branch 1 is absorbed in branch 1', whereas the energy from cavity 12 is directed to the travelling wave tube 10.

Figure 5:
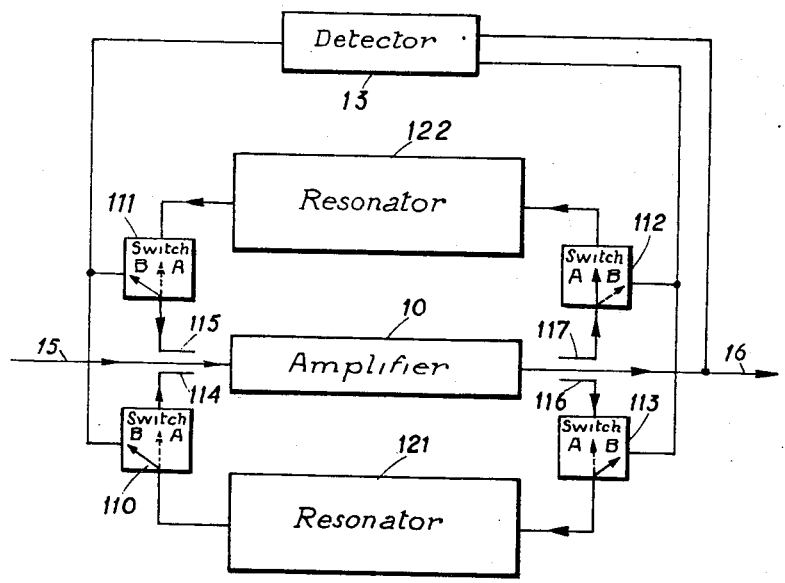
FIG. 5 is another embodiment of the device shown in FIG. 3.

FIG. 5 where the same reference numbers designate the same elements as in FIG. 3 shows a modification of the arrangement of FIG. 3. This modification has the advantage of avoiding any possible self-oscillation. Actually, it may happen in the case of FIG. 3 that cavity 12 behaves as a reaction channel in so far as tube 10 is concerned, causing the same to oscillate.

In FIG. 5, two resonators 121 and 122 similar to resonator 12 are used instead of the latter.

Tube 10 is directly coupled to the source 15 of pulsed signals. Resonator 121 has its output coupled to the input of tube 10, through a switch 110 and a directional coupler 114, and its input coupled to the output of tube 10, through a switch 113 and a directional coupler 116. Resonator 122 has its output coupled to the input of tube 110, through a switch 111 and a directional coupler 115 and its input coupled to the output of tube 10, through a switch 112 and a directional coupler 117. The switches connect tube 10 to resonators 121 and 122 in their position A and disconnect it therefrom in their position B. The conducting direction of directional couplers 114 to 116 is indicated in FIG. 5 by arrows.

There are several stages in the operation of the system:

First stage: Switches 110, 111 and 113 are in position B and switch 112 in position A. The input of cavity 121 is connected to tube 10. Upon arrival of a pulse, a portion of the ultra high frequency energy passes through coupler 116 and is stored in cavity 121.

Second stage: Video system 13 sets switches 113 and 110 in position A and switch 112 in position B. The output of cavity 121 is now coupled to the input of tube 10 whose output is coupled to the input of cavity 122. Cavity 121, which has stored the initial pulse, feeds it to tube 10 which in turn feeds cavity 122. This stage lasts the duration of a pulse.

Third stage: all the switches change their position. Cavity 122 feeds tube 10 which in turn feeds cavity 121. This stage also corresponds to the duration of one pulse.

Subsequently, stages two and three are practically repeated.

Of course the invention is not limited to the embodiments described and shown which were given only by way of example.

What is claimed is:

1. A system for storing ultra high frequency pulsed signals comprising in combination: a cavity resonator having dimensions which are larger than the wave length of said pulsed signals, said resonator having an input and an output; an amplifier tube having an input and an output; means for coupling said tube output to said resonator input; switching means for coupling said tube input to said resonator output; and means coupled to said tube output for controlling said switching means.

2. A system for storing ultra high frequency pulsed signals comprising in combination: a cavity resonator having dimensions which are very large compared to the wave length of said pulsed signals; said resonator having an input and an output; an amplifier tube having an input and an output; means for coupling said tube output to said resonator input; means for collecting said pulsed signals; a switching device having a first operative position wherein said resonator output is coupled to said amplifier input and a second operative position wherein said collecting means is coupled to said amplifier input; means comprising a detector for selectively actuating said switching device between said positions; and means for coupling said actuating means to said amplifier output.

3. A device as claimed in claim 2, wherein said switching device comprises a first and a second hybrid junction, each having a first and a second input arm decoupled from each other and a first and a second output arm; said output arms of one junction being respectively coupled to said output arm of the other junction; one of said input arms of one junction being adapted for receiving said pulsed signals and the other being coupled to said resonator; one of said input arms of the other junction being coupled to said amplifier and the other being adapted for feeding a matched load; and means controlled by said detector for providing a phase shift equal to $\pi$ between said output arms.

4. A device for storing ultra high frequency pulsed signals comprising: a first and a second similar cavity resonators having respective inputs and outputs; an amplifier having an input for collecting said pulsed signals and an output; detector means coupled to said amplifier output; first and second directive couplers respectively coupled to said amplifier input and output; first and second switching means for respectively coupling said resonator inputs to said first directional coupler and disconnecting them therefrom; first and second switching means for respectively coupling said resonator outputs to said second directional coupler and disconnecting them therefrom; and means for controlling said switching means by said detector means.

5. A device for storing ultra high frequency pulsed signals comprising in combination: a cavity resonator having a volume substantially equal to value V given by the formula:

$$V = \frac{\lambda^3 f}{8\pi \Delta f}$$

wherein $\lambda$ is the wavelength of said pulsed signals, $f$ the frequency and $\Delta f$ the pass-band of the cavity resonator; said resonator having an input and an output; an amplifier tube having an input and an output; means for coupling said tube output to said resonator input; switching means for coupling said tube input to said resonator output; and means coupled to said tube for controlling said switching means.

References Cited in the file of this patent

UNITED STATES PATENTS

| | | |
|---|---|---|
| 2,784,378 | Yager | Mar. 5, 1957 |
| 2,809,354 | Allen | Oct. 8, 1957 |